United States Patent [19]
Kameishi et al.

[11] Patent Number: 5,766,793
[45] Date of Patent: Jun. 16, 1998

[54] SAFETY DEVICE FOR USE IN SECONDARY BATTERY

[75] Inventors: Toshizou Kameishi, Gose; Toshiharu Hayashi, Gojo, both of Japan

[73] Assignee: Wako Electronics Co., Ltd., Osaka, Japan

[21] Appl. No.: 727,309

[22] Filed: Oct. 8, 1996

[30] Foreign Application Priority Data

Oct. 9, 1995 [JP] Japan .................. 7-261747

[51] Int. Cl.$^6$ .................................................. H01M 10/50
[52] U.S. Cl. .................................................. 429/62; 429/56
[58] Field of Search .................................. 429/53, 56, 62

[56] References Cited

U.S. PATENT DOCUMENTS

| | | | |
|---|---|---|---|
| 4,035,552 | 7/1977 | Epstein | 429/58 |
| 4,966,822 | 10/1990 | Johnston | 429/62 |
| 5,567,539 | 10/1996 | Takahashi et al. | 429/57 |

FOREIGN PATENT DOCUMENTS

| | | | |
|---|---|---|---|
| 107267 | 5/1984 | European Pat. Off. | 429/53 |
| 313 674 | 5/1989 | European Pat. Off. | |
| 689255 | 12/1995 | European Pat. Off. | |
| 700109 | 3/1996 | European Pat. Off. | |
| 2716862 | 10/1977 | Germany | |
| 4-298971 | 10/1992 | Japan | |
| 6-124695 | 5/1994 | Japan | |

OTHER PUBLICATIONS

Search Report from European Patent Office Jan. 1997.

*Primary Examiner*—Stephen Kalafut
*Attorney, Agent, or Firm*—Wenderoth, Lind & Ponack, L.L.P.

[57] ABSTRACT

A safety device for a battery which can prevent explosion of the battery due to overcharging or shortcircuiting. In the safety device, a current flows through generating unit, lead, terminal of a conductor case, PTC plate, annular terminal, contact to electrode lid. A disk spring, generally called a bimetal, is adapted to bend backward when it is heated to a predetermined temperature. If the generating unit heats up by producing gas due to overcharging or shortcircuiting, the disk spring is heated. When heated to a predetermined temperature, it will bend backward, while pushing up a moving piece, which in turn pushing up the contact, thus separating the contact from the annular terminal. The current-flow path in the battery is thus cut, so that the generating unit will not heat up any further.

10 Claims, 15 Drawing Sheets

SAFETY DEVICE FOR USE IN SECONDARY BATTERY

BACKGROUND OF THE INVENTION

This invention relates to a safety device for preventing overheating of a battery due to overcharging or shortcircuiting.

With the spread of video cameras, headphone stereos and cellphones, a demand is increasing for secondary batteries used as power sources for these gadgets. Such secondary batteries are required to have high heavy-load properties and energy density. Batteries that answer these requirements include nickel-cadomium batteries. Lithium ion batteries are also gaining much attention these days, and efforts to develop and market lithium ion batteries are intensifying.

Secondary batteries of this type have a hermetically sealed structure. Thus, if the generating unit is overheated and produces gas due to overcharging or shortcircuiting, the pressure in the battery case will increase excessively. In an extreme case, the battery case may explode, damaging surrounding devices or harming people therearound.

An object of this invention is to provide a safety device for a battery which can prevent explosion of the battery due to overcharging or shortcircuiting.

SUMMARY OF THE INVENTION

According to this invention, there is provided a safety device for a battery having a battery case and a generating unit airtightly housed in the battery case. The safety device is mounted on the battery case. The safety device includes a temperature-responsive deforming means adapted to be deformed when its temperature rises to a predetermined level, and a switch means provided in a current-flow path in the battery and adapted to change over in association with the deformation of the temperature-responsive deforming means.

In this arrangement, if the generating unit heats up by producing gas due to overcharging or shortcircuiting, the temperature-responsive deforming means is deformed. As it is deformed, the switch means changes over, cutting the current-flow path in the battery.

The temperature-responsive deforming means may be a bimetal or may be made from a shape memory alloy deformable as it is heated.

According to the invention, there is also provided a safety device for a battery having a battery case and a generating unit airtightly housed in the battery case. The safety device is mounted on the battery case. The safety device includes a thermally expansible means, and a switch means provided in a current-flow path in the battery and adapted to change over in association with thermal expansion of the thermally expansible means.

In this arrangement, if the generating unit heats up due to overcharging or shortcircuiting, the thermally expansible means expands, thus changing over the switch means provided in the current-flow path in the battery. The current-flow path is thus cut.

According to the invention, there is also provided a safety device for a battery having a battery case and a generating unit airtightly housed in the battery case, the safety device is mounted on the battery case, the safety device includes a temperature-responsive deforming means in the form of a conductor adapted to be deformed when its temperature rises to a predetermined level, and terminals in contact with the temperature-responsive deforming means, the temperature-responsive deforming means and the terminals being provided in a current-flow path in the battery so that the temperature-responsive deforming means separates from at least one of the terminals when the temperature-responsive deforming means deforms.

The temperature-responsive deforming means, which is normally in contact with the terminals, separates from the terminal when it is heated and deformed, thus cutting the current-flow path. Since the temperature-responsive deforming means and the switch means are provided in the current-flow path, if an overcurrent flows through the current-flow path, the temperature-responsive deforming means quickly heats up, deforms and separates from the terminals, so that the current-flow path is cut quickly enough.

According to the invention, there is also provided a safety device for a battery having a battery case and a generating unit airtightly housed in the battery case. The safety device being mounted on the battery case. The safety device includes a temperature-responsive deforming means in the form of a conductor adapted to be deformed when its temperature rises to a predetermined level, and a switch means provided adjacent to the temperature-responsive deforming means. The switch means is provided in a current-flow path in the battery and adapted to change over when the temperature-responsive deforming means deforms due to heat transfer from the switch means.

In this arrangement, the temperature-responsive deforming means and the switch means are provided adjacent to each other. If an overcurrent flows through the current-flow path and the switch means heats up, heat is transferred from the switch means to the temperature-responsive deforming means, so that the latter is heated and deformed. The switch means thus changes over, cutting the current-flow path.

Other features and objects of the present invention will become apparent from the following description made with reference to the accompanying drawings, in which:

DETAILED DESCRIPTION OF THE PREFERRED EMBODIMENT

Embodiments of this invention will now be described with reference to the accompanying drawings.

Figure 1:
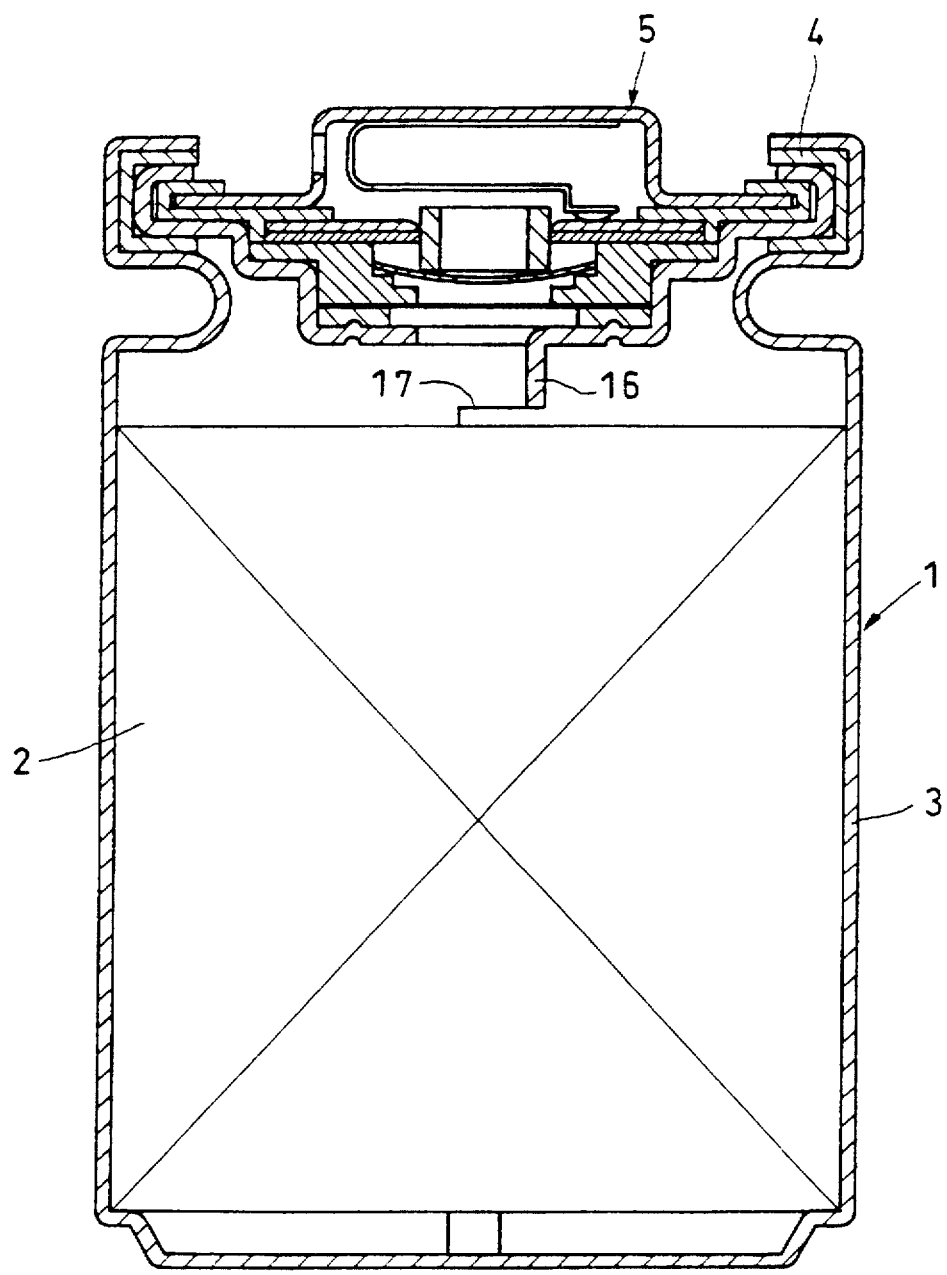
FIG. 1 is a sectional view of a secondary battery provided with a safety device of a first embodiment according to the present invention.

FIG. 1 shows a secondary battery provided with a safety device of the first embodiment of the invention. The secondary battery 1 has a generating unit 2 sealed in a battery case 3. The safety device 5 is supported by caulking on top of the battery case 3 through an insulating member 4.

Figure 2:
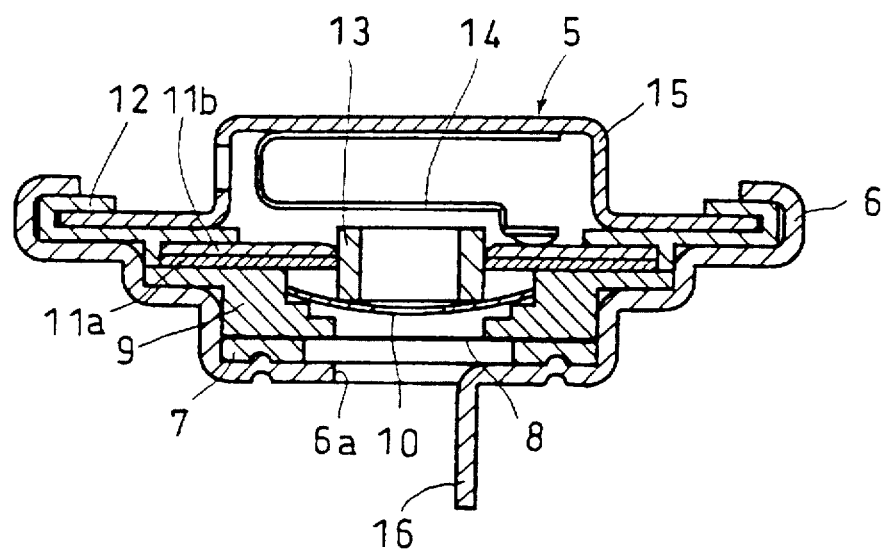
FIG. 2 is a sectional view of the safety device of FIG. 1.

As shown in FIG. 2, the safety device 5 is assembled by placing a gasket 7, aluminum foil 8, a circular frame 9, disk spring 10, a PTC plate 11a, an annular terminal 11b and an insulating seal 12 one after another in a conductor case 6, inserting a moving piece 13 into holes formed in the PTC plate 11a and the annular terminal 11b, covering them with an electrode lid 15 having a contact 14 resistance-welded thereto, and caulking the edge of the conductor case 6 to clamp the edge of the electrode lid 15 through the insulating seal 12.

Figure 3:
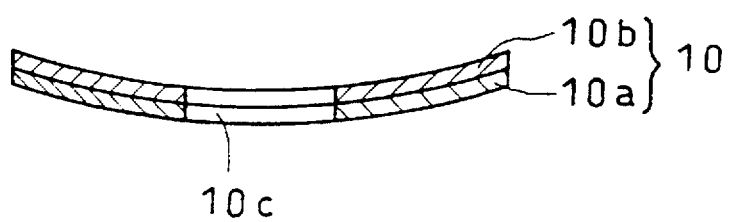
FIG. 3 is a sectional view of a disk spring used in the safety device of FIG. 1.

Referring to FIG. 3, the disk spring 10, generally called "bimetal", comprises two layers 10a and 10b made of metals having different thermal expansion coefficients from each other. That is, the layer 10a, which is on the convex side of the disk spring 10, has a smaller thermal expansion coefficient than the layer 10b, which is on the concave side. Thus, the higher the temperature rises, the greater the layer 10b on the concave side expands than the layer 10a on the convex side, and at a predetermined temperature, the disk spring 10 will bend backward.

The disk spring may have a trimetallic structure instead of the illustrated bimetallic structure.

The PTC plate 11a is a positive temperature coefficient thermistor whose resistivity is low at room temperature and increases sharply if the temperature exceeds a predetermined point. It is provided to ensure higher safety.

The conductor case 6 has a hole 6a in its bottom so that the pressure in the secondary battery 1 acts on the aluminum foil 8 through the hole 6a. A terminal 16 hangs down from the edge off the hole 6a and is connected to the generating unit 2 through a lead 17.

The contact 14 of the electrode lid 15 is made of a sufficiently resilient material and has its tip in contact with the annular terminal 11b.

In the safety device 5, a current flows through generating unit 2→lead 17→terminal 16 of the conductor case 6→circular frame 9→PTC plate 11a→annular terminal 11b→contact 14→electrode lid 15.

In this arrangement, if an excess current flows in the battery due to overcharging or shortcircuiting, the PTC plate 11a will heat up to a temperature higher than the above-mentioned predetermined point, resulting in a sharp increase in its resistivity. The excess current thus subsides, so that the overcharging or shortcircuiting is avoided.

Even though the PTC plate 11a can abate an excess current, the pressure in the battery case 3 may increase due to gas produced from the generating unit 2, and as a result the generating unit 2 may be overheated.

Figure 4:
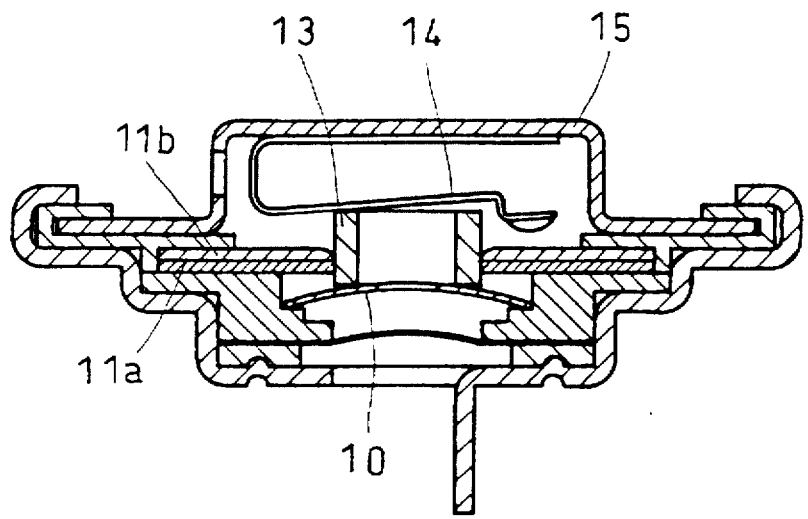
FIG. 4 is a view used to explain the operation of the safety device of FIG. 1.

If this happens, heat from the generating unit 2 will be conducted to the disk spring 10 through the battery case 3, conductor case 6 and circular frame 9. Otherwise, the current-flow path in the safety device 5 will heat up due to overcurrent, and the heat produced is conducted to the disk spring 10. In either case, the temperature of the disk spring 10 increases gradually, and when it reaches a predetermined level, the disk spring 10 will bend backward as shown in FIG. 4, thus pushing up the moving piece 13, which in turn pushes up the contact 14, thus separating the contact 14 from the annular terminal 11b. The current-flow path in the safety device 5 is thus cut, so that the generating unit 2 will not heat up any further.

Figure 5:
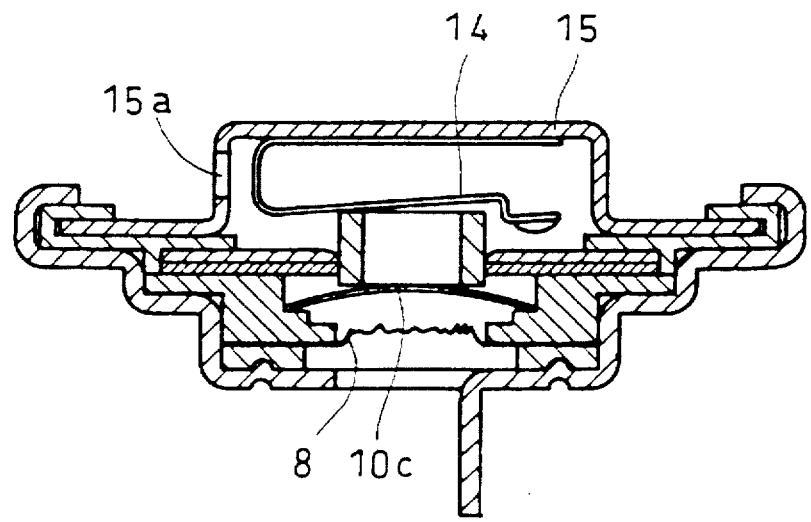
FIG. 5 is a view used to explain the operation of the safety device of FIG. 1.

If the generating unit 2 still keeps producing gas, thus increasing the pressure in the battery case 3, even after the current flow path has been cut, the aluminum foil 8 will rupture as shown in FIG. 5, allowing the gas in the battery case 3 to be released through a center hole 10c formed in the disk spring 10 into the interior of the electrode lid 15 and then into the atmosphere through a hole 15a formed in the electrode lid 15. It is thus possible to prevent explosion of the battery case 3.

As described above, the safety device is provided with triple safety means against explosion of the secondary battery 1, i.e. the PTC plate 11a for suppressing overcurrent, the disk spring 10 for cutting the flow of current by flipping over, and the aluminum foil 8 adapted to release inner gas by rupturing.

Instead of aluminum foil, foil of other metal or synthetic resin film may be used singly or in combination. If a metal foil is used, it may be coated with a resin film to prevent corrosion of the foil.

Figure 6:
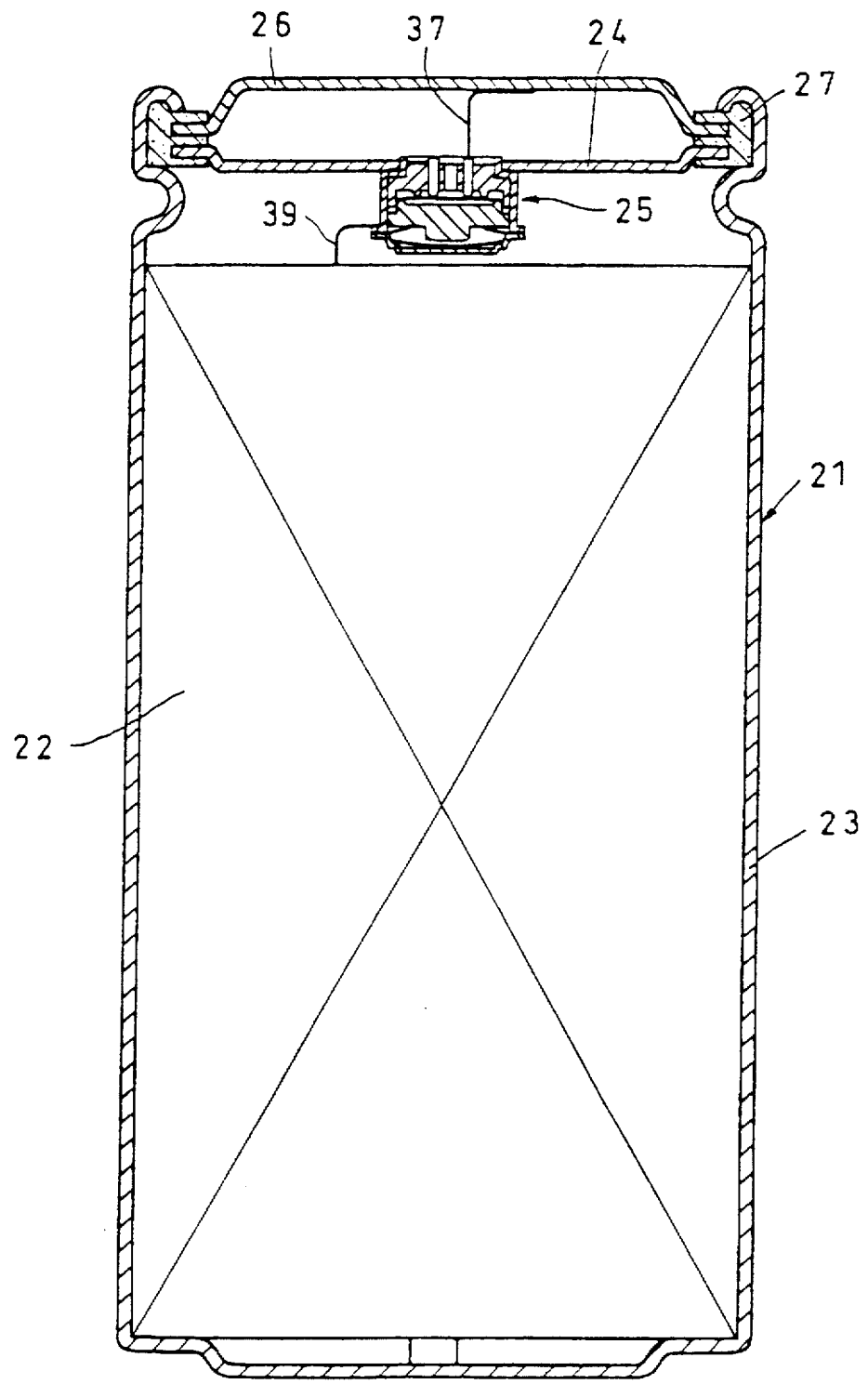
FIG. 6 is a sectional view of a secondary battery provided with a safety device of a second embodiment according to the present invention.

FIG. 6 shows a secondary battery 21 provided with a safety device of the second embodiment of the invention. In this embodiment, the safety device 25 is mounted on an inner lid 24 of a battery case 23 in which is sealed a generating unit 22. The inner lid 24 and an electrode cover 26 are supported by caulking on top of the battery case 23 through an insulating member 27.

Figure 7:
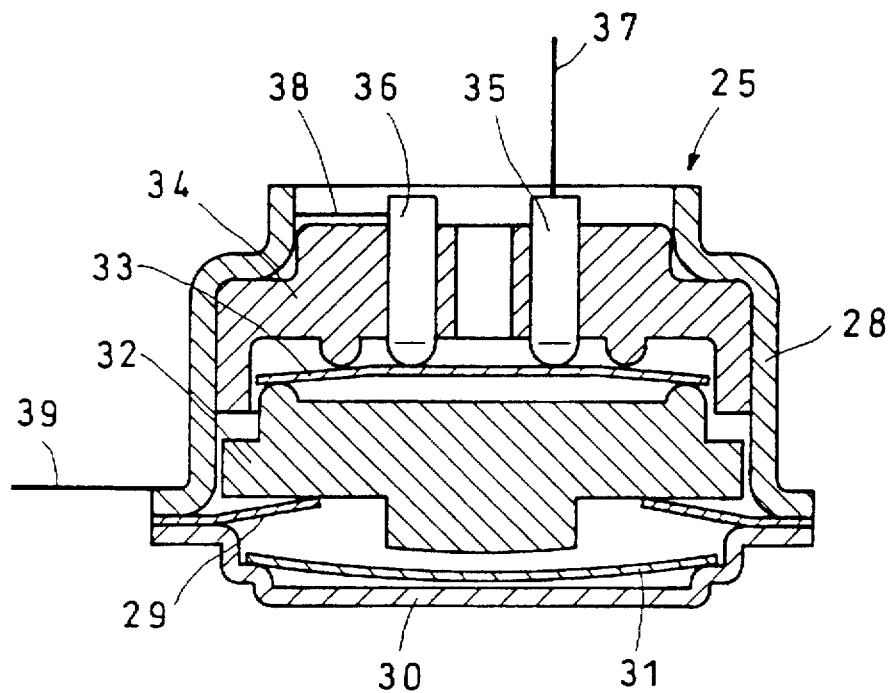
FIG. 7 is a sectional view of the safety device of FIG. 6.

The safety device 25, shown in detail in FIG. 7, has an annular frame 29 and a bottom plate 30 welded (or bonded)

to a substantially cylindrical conductor case 28 along the edge of its bottom opening. A disk spring 31, moving piece 32, contact 33 and insulating frame 34 are stacked one on another in the conductor case 28.

The disk spring 31 is a bimetal similar to the disk spring 10 shown in FIG. 3. It flips over when the temperature exceeds a predetermined point.

Two terminals 35 and 36 are embedded in the insulating frame 34. They are both in contact with the contact 33. The terminal 35 is connected to the electrode lid 26 of the battery case 23 through a lead 37, while the other terminal 36 is connected to the generating unit 22 through the conductor case 28 and a lead 39.

In the safety device 25, a current flow through generating unit 22→lead 39→conductor case 28→lead 38→terminal 36→contact 33→terminal 35→lead 37→electrode lid 26.

Figure 8:
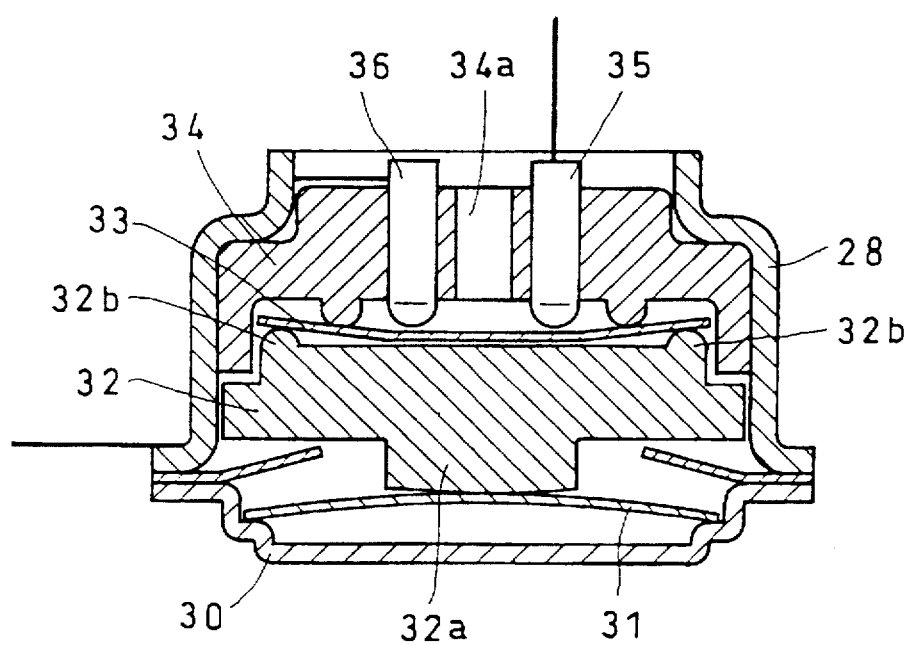
FIG. 8 is a view used to explain the operation of the safety device of FIG. 6.

If the generating unit heats up due to overcharging or shortcircuiting, the heat from the generating unit 22 will be conducted to the disk spring 31 through the battery case 23, conductor case 28 and bottom lid 30. Otherwise, the current-flow path in the safety device 25 will heat up due to overcurrent, and the heat produced is conducted to the disk spring 31. In either case, the temperature of the disk spring 31 increases, and when it reaches a predetermined level, the disk spring 31 will bend backward as shown in FIG. 8, thus pushing up the moving piece 32 by abutting its protrusion 32b. As the moving piece 32 is pushed up, its protrusions 32b push up both ends of the contact 33 to deflect the contact 33 downward. The contact 33 thus separates from the terminals 35 and 36, cutting the current-flow path in the safety device 25. It is thus possible to prevent the generating unit 22 from heating up any further.

The safety device 25 can be inspected nondestructively in the following manner.

First, a check is made on whether or not the terminals 35 and 36 are electrically connected together. If not, the safety device 25 is defective.

The conductor case 28 is then heated to increase the temperature of the disk spring 31 to a predetermined point to flip it over. If the terminals 35 and 36 are still electrically connected together in this state, the safety device is judged to be defective.

In the next step, after the disk spring 31 has cooled down to normal temperature, a thin rod (not shown) is inserted through a hole 34a formed in the insulating frame 34 to push down the contact 33 at its center to bend the disk spring 31 again to its original state. If the terminals 35 and 36 have been electrically connected together again, the safety device 25 is judged nondefective.

Figure 9:
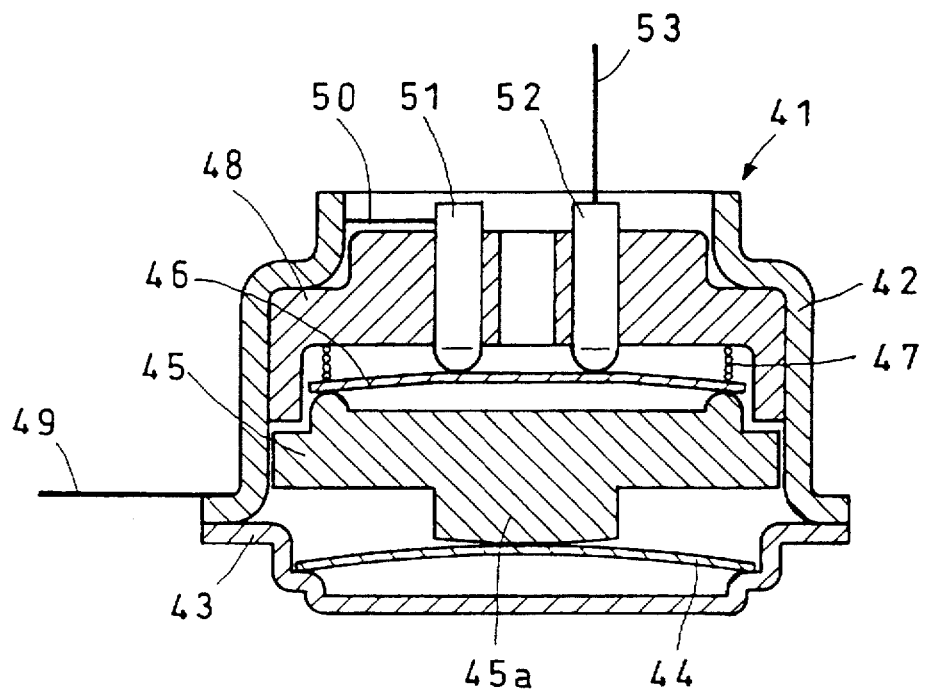
FIG. 9 is a sectional view of a safety device of a third embodiment according to the present invention.

FIG. 9 shows a secondary battery of the third embodiment of the invention. The safety device 41 of this embodiment is mounted on the inner lid 24 of the secondary battery 21, in place of the safety device 25 shown in FIG. 6.

The safety device 41 is provided with a substantially cylindrical conductor case 42 having a bottom opening closed by a bottom cover 43. In the conductor case 42, a disk spring 44, moving piece 45, contact 46, coil spring 47 and insulating frame 48 are stacked one on another.

The disk spring 44 is a bimetal adapted to bend backward when the temperature exceeds a predetermined point.

The contact 46 is biased upward by the disk spring 44 through the moving piece 45 and in contact with terminals 51 and 52.

In the safety device 41, a current flows through generating unit 22→lead 49→conductor case 42→lead 50→terminal 51→contact 46→terminal 52→lead 53→electrode lid 26.

Figure 10:
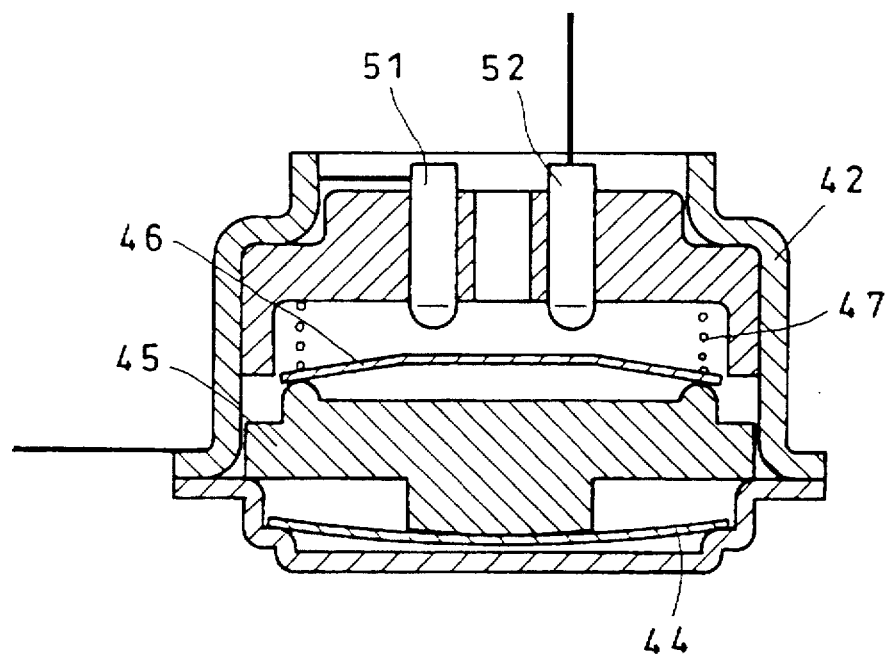
FIG. 10 is a view used to explain the operation of the safety device of FIG. 9.

If the generating unit 22 or the safety device 41 heats up due to overcharging or shortcircuiting, the heat produced is conducted to the disk spring 44, heating the disk spring 44. When its temperature reaches a predetermined level, it will bend backward so that its downside is convexed as shown in FIG. 10. The contact 46 and the moving piece 45 are thus pushed down by the coil spring 47 until the contact 46 separates from the terminals 51 and 52. The current path is now cut, so that the generating unit 22 will not heat up any further.

Figure 11:
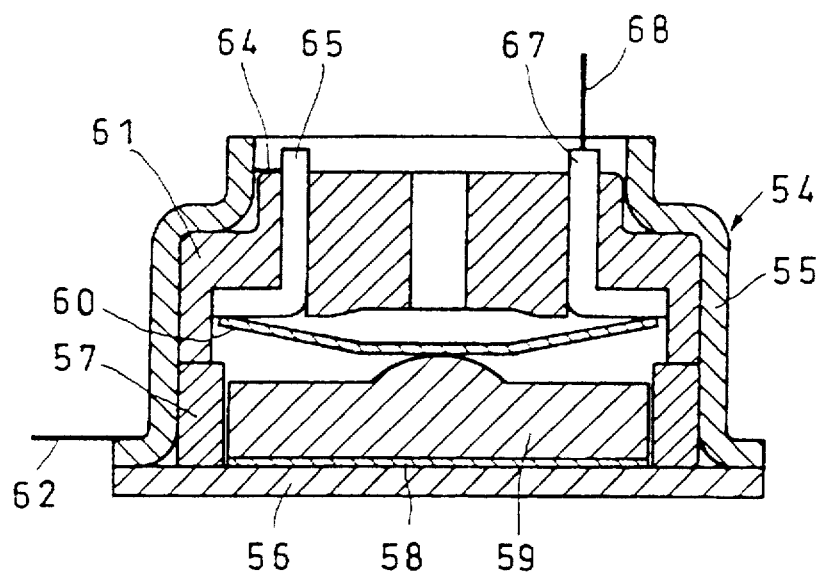
FIG. 11 is a sectional view of a safety device of a fourth embodiment according to the present invention.

FIG. 11 shows the fourth embodiment of the safety device according to the invention. The safety device 54 of this embodiment is provided with a conductor case 55 having a bottom opening closed by a bottom lid 56. A cylindrical member 57 is placed on the bottom lid 56. A disk 58 and a moving piece 59 are placed one on the other in the cylindrical member 57. Further, a disk spring 60 and an insulating frame 61 are placed thereon.

The disk 58 is a flat bimetal adapted to deflect gradually as the temperature rises. The disk spring 60 is not a bimetal but made of a single material, so that it is not deformed by heat. Instead, it is adapted to bend backward when a pressure higher than a predetermined level acts on its underside.

In the safety device 54, a current flows through generating unit 22→lead 62→conductor case 55→lead 64→terminal 65→disk spring 60→terminal 67→lead 68→electrode lid 26.

Figure 12:
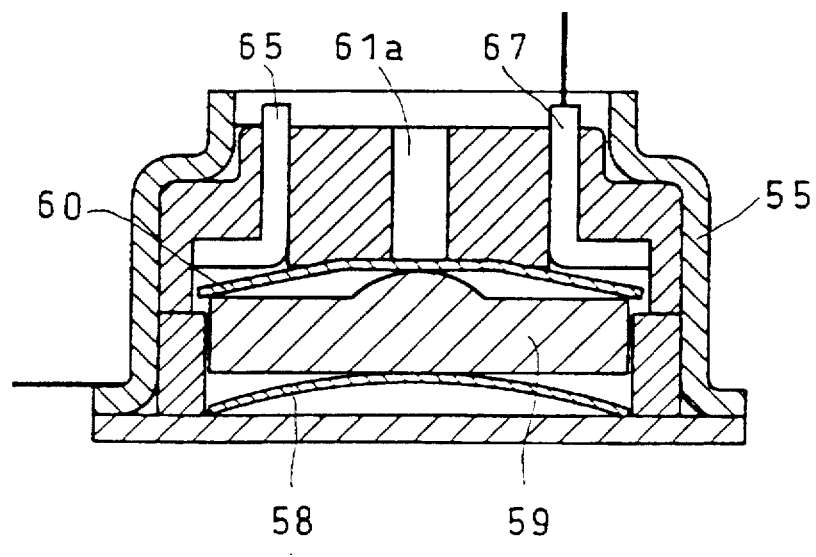
FIG. 12 is a view used to explain the operation of the safety device of FIG. 11.

If the disk 58 is heated due to overcharging or shortcircuiting, the disk 58 deflects as shown in FIG. 12, that is, its center bulges upward, pushing up the moving piece 59 to put pressure on the center of the disk spring 60 from below. When the disk 58 is heated to a predetermined temperature and the pressure on the disk spring 60 reaches a predetermined level, the disk spring 60 flips over, so that its edge will separate from the terminals 65 and 67. The current path of the safety device 54 is now cut, so that the generating unit 22 will not heat up any further.

The safety device 54 can be inspected nondestructively in the following manner. First, a check is made on whether or not the terminals 65 and 67 are electrically connected together. The conductor case 55 is then heated to increase the temperature of the disk 58 to a point at which the disk spring 60 is supposed to bend backward due to deformation of the disk 58. In order to confirm that the disk spring 60 has actually flipped over, a check is made on whether or not the terminals 65 and 67 have been electrically disconnected from each other. In the next step, after the disk 58 has cooled down to normal temperature, a thin rod (not shown) is inserted through a hole 61a formed in the insulating frame 61 to push down the disk spring 60 at its center to bend the disk spring 60 again to its original state. If the terminals 65 and 67 have been electrically connected together again, the safety device 54 is judged nondefective.

In the above-described embodiments, bimetallic disk springs and disks are used. But use may be made of any other member adapted to be deformed when the temperature reaches a predetermined point. A shape memory alloy is one example of such a member.

The safety devices of the second through fourth embodiments may be provided with a PTC plate to suppress overcurrent and/or an aluminum foil which can release inner gas by rupturing, as in the first embodiment.

Figure 13:
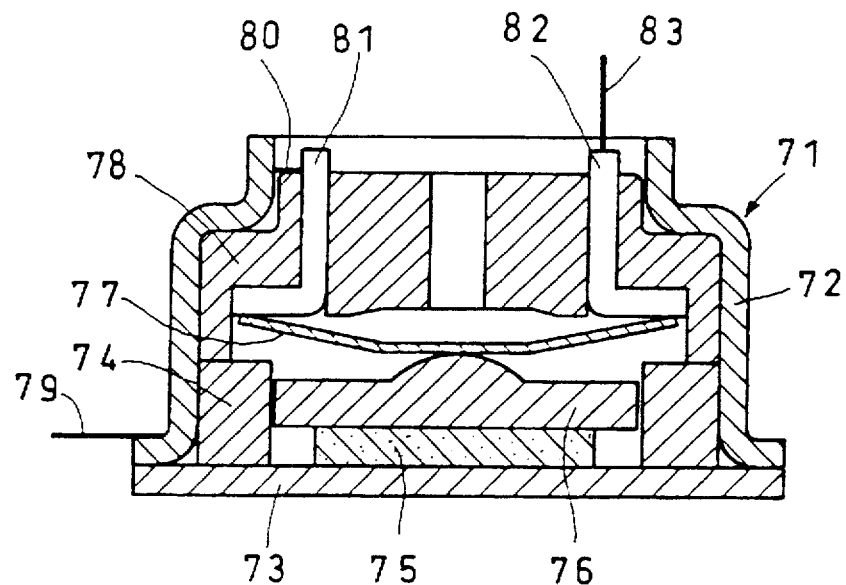
FIG. 13 is a sectional view of a safety device of a fifth embodiment according to the present invention.

FIG. 13 shows a fifth embodiment of the safety device according to the invention. The safety device 71 of this embodiment is mounted on the inner lid 24 of the secondary battery 21 shown in FIG. 6 in place of the safety device 25.

The safety device 71 is provided with a conductor case 72 having a bottom opening closed by a bottom lid 73. A cylindrical member 74 is placed on the bottom lid 73. A spacer 75 and a moving piece 76 are placed one on the other in the cylindrical member 74. Further, a disk spring 77 and an insulating frame 78 are placed thereon.

The spacer 75 is molded from a silicone rubber having a large thermal expansion coefficient, a synthetic rubber or elastomer such as NBR, or a synthetic resin. It is adapted to expand gradually as its temperature rises.

The disk spring 77 is not a bimetal but is made of a single material, so that it is not deformed by heat.

In the safety device 71, a current flows through generating unit 22→plead 79→conductor case 72→lead 80→terminal 81→disk spring 77→terminal 82→lead 83→electrode lid 26.

Figure 14:
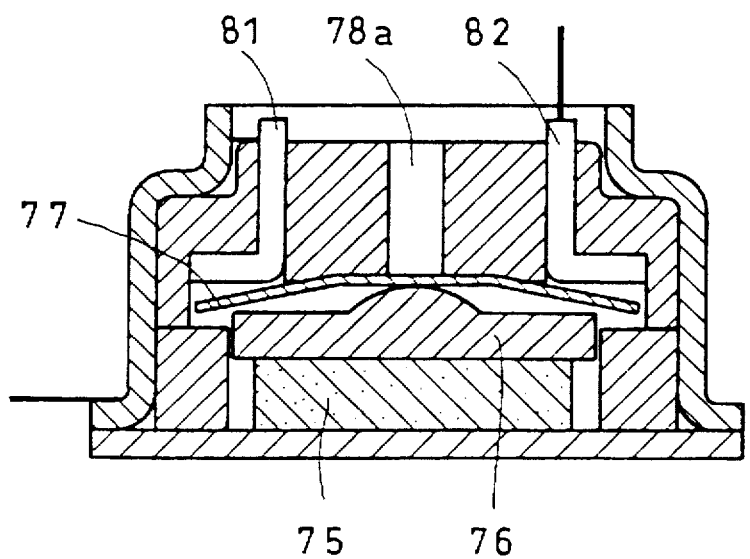
FIG. 14 is a view used to explain the operation of the safety device of FIG. 13.

If the spacer 75 is heated due to overcharging or shortcircuiting, it expands as shown in FIG. 14. When its height reaches a predetermined level due to thermal expansion, it pushes up the center of the disk spring 77 through the moving piece 76. The disk spring 77 thus flips over, so that its edge separates from the terminals 81 and 82. The current path in the safety device 71 is now cut, so that the generating unit 22 will not heat up any further.

The safety device 71 can be inspected nondestructively in the following manner. First, a check is made on whether or not the terminals 81 and 82 are electrically connected together. The spacer 75 is then heated to increase its temperature to a predetermined point to bend the disk spring 77 backward. In this state, it is determined whether or not the terminals 81 and 82 have been electrically disconnected from each other. In the next step, after the spacer 75 has cooled down to normal temperature, a thin rod is inserted through a hole 78a formed in the insulating frame 78 to push down the disk spring 77 at its center to bend the disk spring 77 again to its original state. If the terminals 81 and 82 have been electrically connected together again, the safety device 71 is judged nondefective.

The safety device 71 may be provided with a PTC plate to suppress overcurrent and/or an aluminum foil which can release inner gas by rupturing, as in the first embodiment according to the invention.

Figure 15:
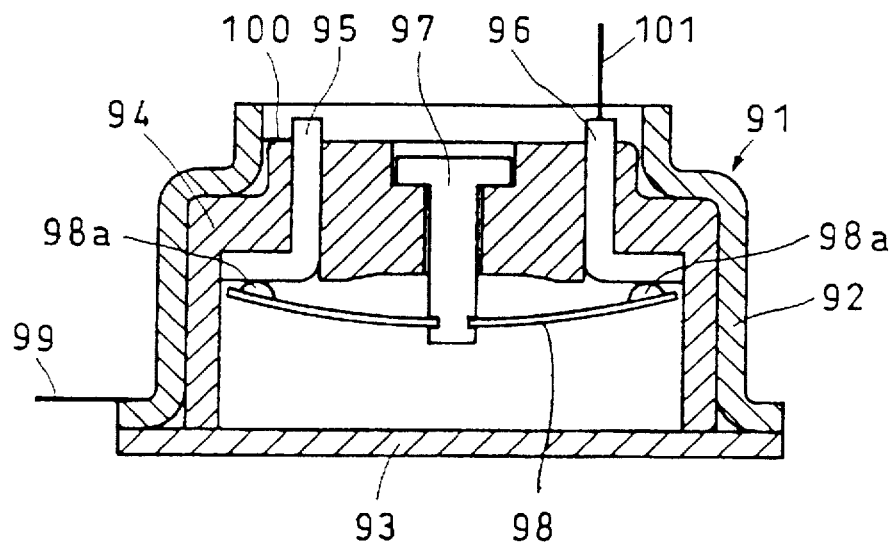
FIG. 15 is a sectional view of a safety device of a sixth embodiment according to the present invention.

FIG. 15 shows a sixth embodiment of the safety device according to the invention. The safety device 91 of this embodiment is mounted on the inner lid 24 of the secondary battery 21 shown in FIG. 6 in place of the safety device 25.

The safety device 91 is provided with a conductor case 92 having a bottom opening closed by a bottom lid 93. A hollow insulating frame 94 is placed in the conductor case 92. Two terminals 95 and 96 are embedded in the insulating frame 94. A pin 97 extends through a central hole formed in the insulating frame 94. It has its bottom end connected to the center of a disk spring 98 having protrusions 98a in contact with terminals 95 and 96.

The disk spring 98 is a bimetal adapted to bend backward when it is heated to a predetermined temperature.

In the safety device 91, a current flows through generating unit 22→lead 99→conductor case 92→lead 100→terminal 95→disk spring 98→terminal 96→lead 101.

Figure 16:
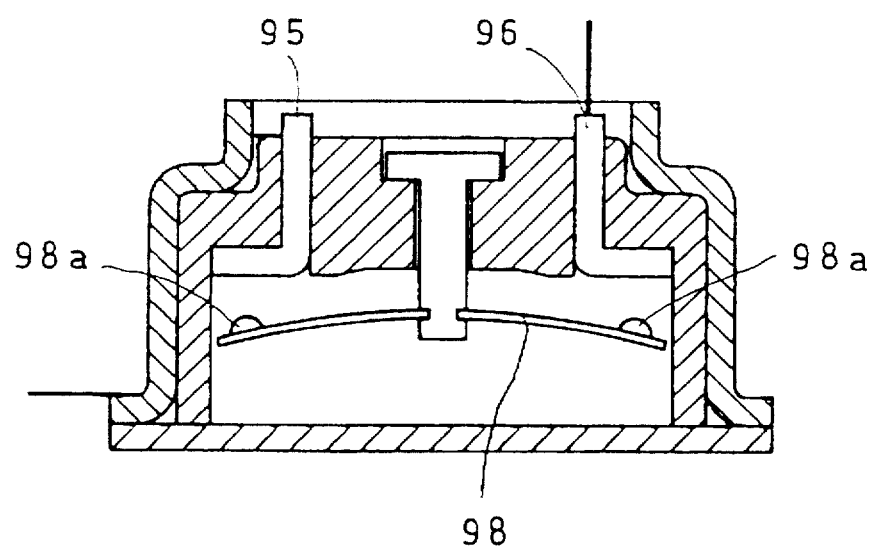
FIG. 16 is a view used to explain the operation of the safety device of FIG. 15.

If the disk spring 98 is heated to a predetermined temperature due to overcharging or shortcircuiting, the disk spring 98 will bend backward as shown in FIG. 16, so that its protrusions 98a will separate from the terminals 95 and 96.

Since the disk spring 98 is in the current-flow path, if an overcurrent flows, it will heat itself up and bend backward quickly, thus cutting the current-flow path instantly. That is, the disk spring 98 flips over not by heat conducted from outside but by heating itself up, so that it is possible to instantly stop overheating of the generating unit 22 due to overcurrent.

Figure 17:
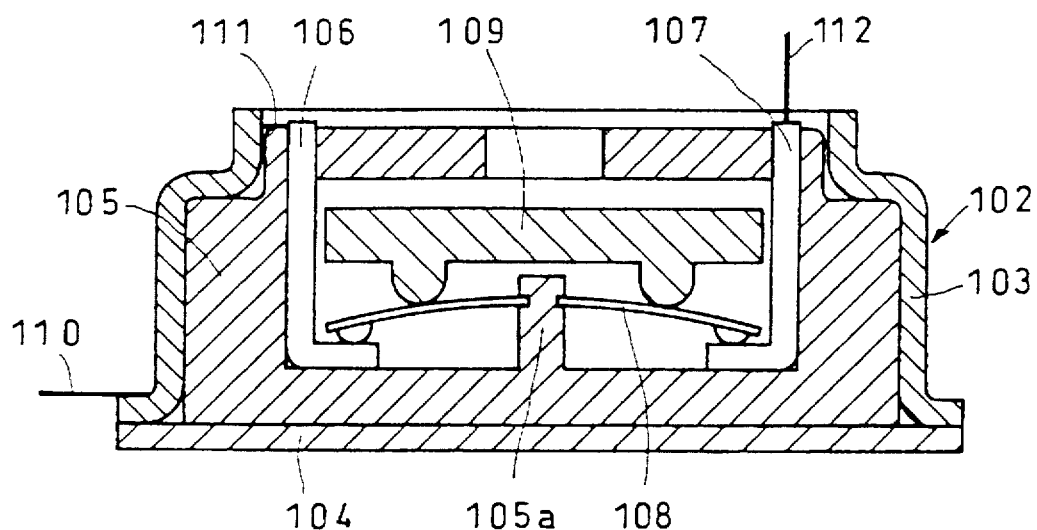
FIG. 17 is a sectional view of a safety device of a seventh embodiment according to the present invention.

FIG. 17 shows a seventh embodiment of the safety device according to the invention. The safety device 102 of this embodiment is provided with a conductor case 103 having a bottom opening closed by a bottom lid 104. A hollow insulating frame 105 is placed in the conductor case 103. The insulating frame 105 has two terminals 106 and 107 fixed thereto and is formed with a protrusion 105a connected to the center of a bimetallic disk spring 108. A spacer 109 is placed on the disk spring 108.

In the safety device 102, a current flows through generating unit 22→lead 110→conductor case 103→lead 111→terminal 106→disk spring 108→terminal 107→lead 112.

Figure 18:
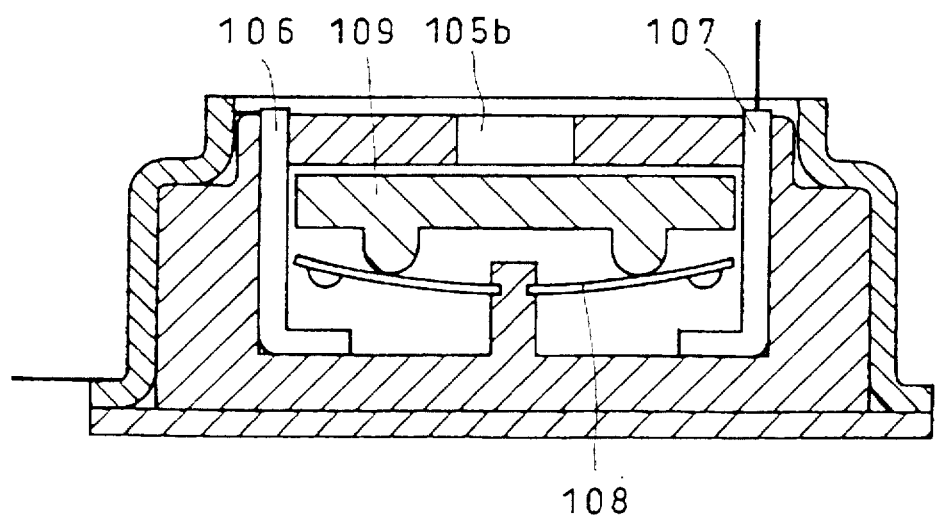
FIG. 18 is a view used to explain the operation of the safety device of FIG. 17.

Since the disk spring 108 is in the current-flow path as in the first embodiment, if an overcurrent flows, it will heat itself up and bend backward quickly as shown in FIG. 18, thus cutting the current-flow path instantly. The disk spring 108 is also adapted to bend backward if it is heated to a predetermined temperature by heat conducted from outside.

The safety device 102 can be inspected nondestructively in the following manner. First, a check is made on whether or not the terminals 106 and 107 are electrically connected together. The disk spring 108 is then heated to increase its temperature to a predetermined point to flip it over. In this state, a check is made on whether or not the terminals 106 and 107 have been electrically disconnected from each other. In the next step, after the disk spring 108 has cooled down to normal temperature, a thin rod is inserted through a hole 105b formed in the insulating frame 105 to push down the spacer 109 at its center to flip the disk spring 108 over again to its original state. If the terminals 106 and 107 have been electrically connected together again, the safety device 102 is judged nondefective.

Figure 19:
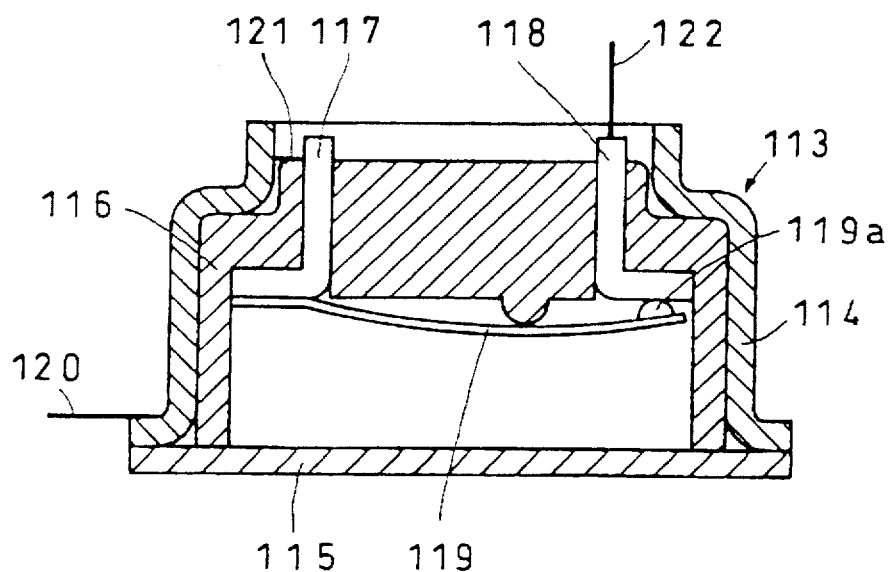
FIG. 19 is a sectional view of a safety device of an eighth embodiment according to the present invention.

FIG. 19 shows an eighth embodiment of the safety device according to the invention. The safety device 113 of this embodiment is provided with a conductor case 114 having a bottom opening closed by a bottom lid 115. A hollow insulating frame 116 is placed in the conductor case 114. The insulating frame 116 has two terminals 117 and 118 and a bimetallic disk spring 119 having one end thereof fixedly connected to the terminal 117 and its protrusion 119a in contact with the terminal 118.

In the safety device 113, a current flows through generating unit 22→lead 120→conductor case 114→lead 121→terminal 117→disk spring 119→terminal 118→lead 122.

Figure 20:
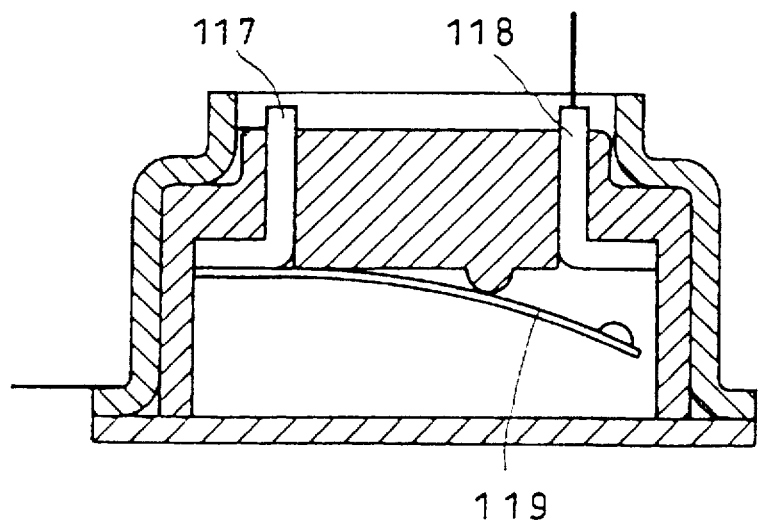
FIG. 20 is a view used to explain the operation of the safety device of FIG. 19.

If an overcurrent flows through the current-flow path, the disk spring 119 will heat itself up and bend backward quickly as shown in FIG. 20. This disk spring 119 is also adapted to bend backward if its temperature rises to a predetermined point by heat conducted from outside. In either case, the current-flow path is cut.

Figure 21:
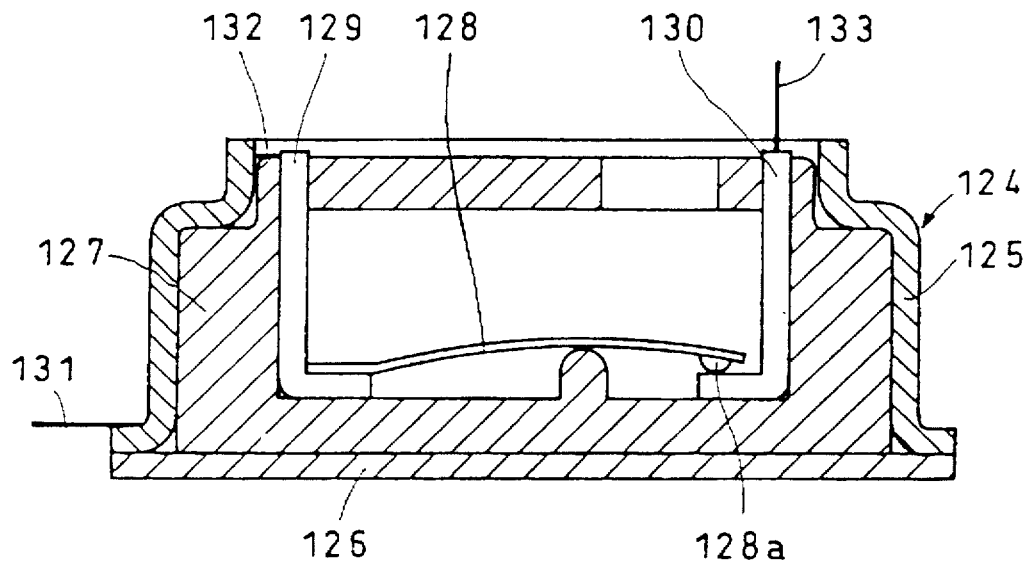
FIG. 21 is a sectional view of a safety device of a ninth embodiment according to the present invention.

FIG. 21 shows a ninth embodiment of the safety device according to the invention. The safety device 124 of this embodiment is provided with a conductor case 125 having a bottom opening closed by a bottom lid 126. A hollow insulating frame 127 is placed in the conductor case 125. A bimetallic disk spring 128 is placed in the conductor case 125. The disk spring 128 has its one end fixedly connected to the terminal 129 and its protrusion 128a in contact with the terminal 130.

In the safety device 124, a current flows through generating unit 22→lead 131→conductor case 125→lead 132→terminal 129→disk spring 128→terminal 130→lead 133.

Figure 22:
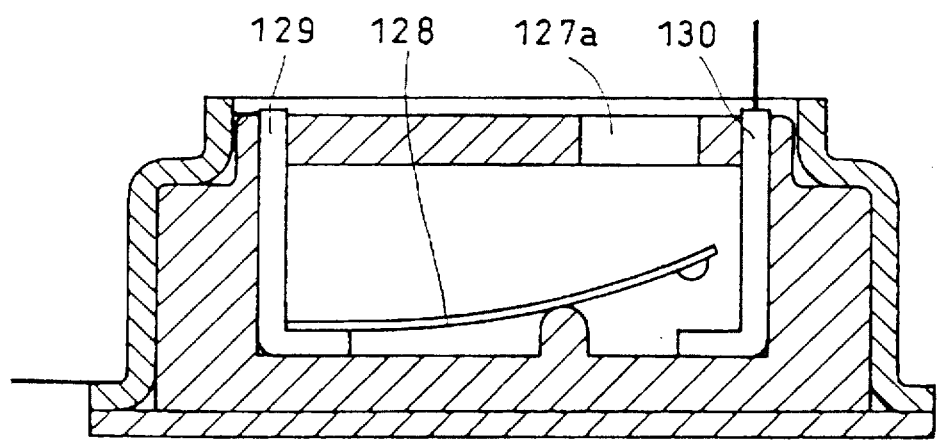
FIG. 22 is a view used to explain the operation of the safety device of FIG. 21.

Since the disk spring 128 is in the current-flow path, if an overcurrent flows through the current-flow path, the disk spring 128 will heat itself up and bend backward quickly as shown in FIG. 22, thus instantly cutting the current-flow path.

The safety device 124 can be inspected nondestructively in the following manner. First, a check is made on whether or not the terminals 129 and 130 are electrically connected together. The disk spring 128 is then heated to increase its temperature to a predetermined point to flip it over. In this state, a check is made on whether or not the terminals 129 and 130 have been electrically disconnected from each other. In the next step, after the disk spring 128 has cooled down to normal temperature, a thin rod is inserted through a hole 127a formed in the insulating frame 127 to push down the disk spring 128 at its center to flip it over again to its original state. If the terminals 129 and 130 have been electrically connected together again, the safety device 124 is judged nondefective.

The safety devices of the sixth through ninth embodiments of the invention may be provided with a PTC plate to suppress overcurrent and/or an aluminum foil which can release inner gas by rupturing, as in the first embodiment of the invention.

Figure 23:
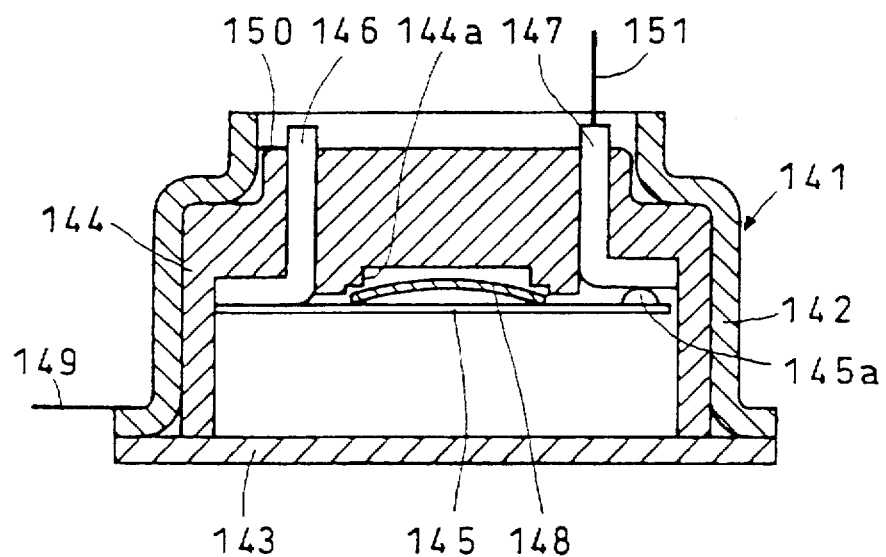
FIG. 23 is a sectional view of a safety device of a tenth embodiment according to the present invention.

FIG. 23 shows a tenth embodiment of the safety device according to the invention. The safety device 141 of this embodiment includes a hollow insulating frame 144 provided inside a conductor case 142 and a bottom lid 143. A contact 145 has one end thereof connected to a terminal 146 and its protrusion 145a in contact with a terminal 147. A bimetallic disk spring 148 is superposed on the center of the contact 145 and is received in a recess 144a formed in the center of the insulating frame 144.

In the safety device 141, a current flows through generating unit 22→lead 149→conductor case 142→lead 150→terminal 146→contact 145→terminal 147→lead 151.

Figure 24:
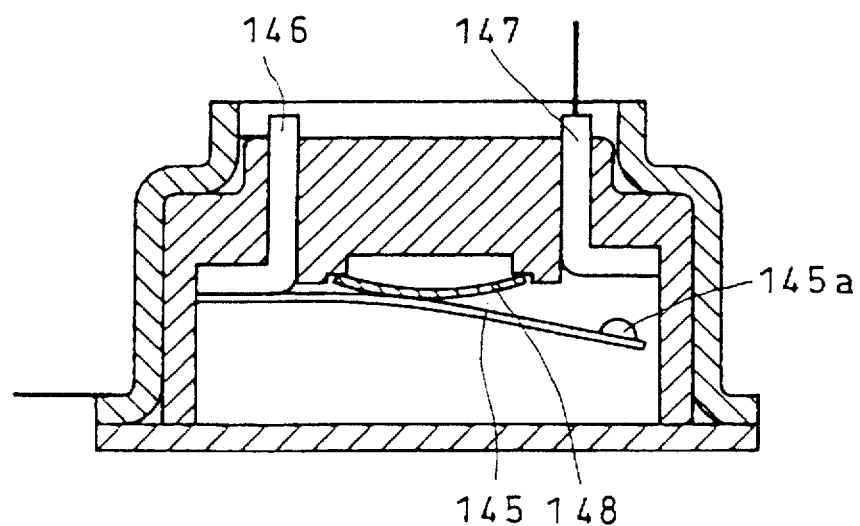
FIG. 24 is a view used to explain the operation of the safety device of FIG. 23.

If an overcurrent flows through the current-flow path, the contact 145 will heat itself up quickly. The heat from contact 145 is instantly conducted to the disk spring 148, so that the disk spring 148 is quickly heated and flips over as shown in FIG. 24. The disk spring 148 is also adapted to bend backward when heat is conducted from outside. In either case, the protrusion 145a of the contact 145 separates from the terminal 147, so that the current-flow path is cut.

Figure 25:
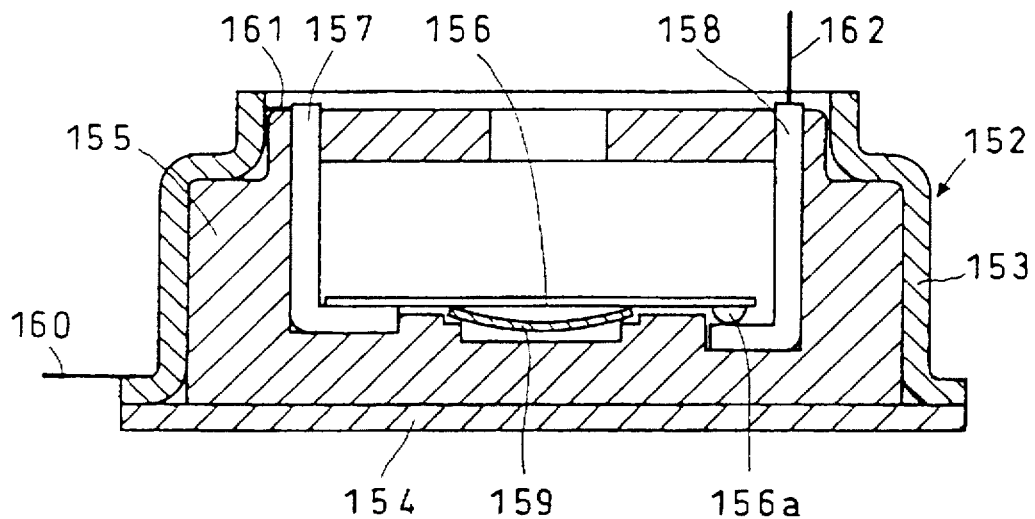
FIG. 25 is a sectional view of a safety device of eleventh embodiment according to the present invention.

FIG. 25 shows an eleventh embodiment of the safety device according to the invention. The safety device 152 of this embodiment includes a hollow insulating frame 155 provided inside a conductor case 153 and a bottom lid 154. A contact 156 has one end thereof connected to a terminal 157 and its protrusion 156a in contact with a terminal 158. A bimetallic disk spring 159 is retained under the contact 156.

In the safety device 152, a current flows through generating unit 22→lead 160→conductor case 153→lead 161→terminal 157→contact 156→terminal 158→lead 162.

Figure 26:
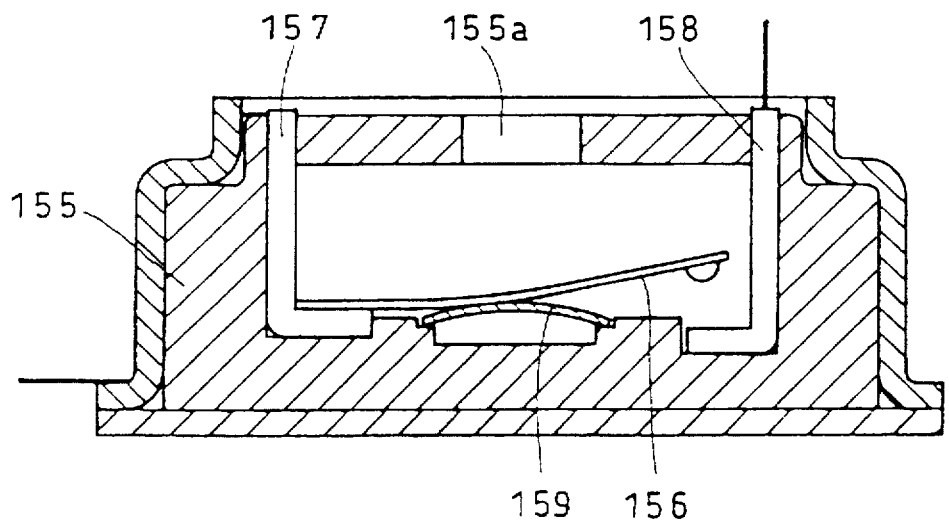
FIG. 26 is a view used to explain the operation of the safety device of FIG. 25.

If an overcurrent flows through the current-flow path, the disk spring 159 is heated quickly together with the contact 156 and flips over as shown FIG. 26, so that the current-flow path is cut instantly.

The safety device 152 can be inspected nondestructively in the following manner. First, a check is made on whether or not the terminals 157 and 158 are electrically connected together. The disk spring 159 is then heated to increase its temperature to a predetermined point to flip it over. In this state, a check is made on whether or not the terminals 157 and 158 have been electrically disconnected from each other. In the next step, after the disk spring 159 has cooled down to normal temperature, a thin rod is inserted through a hole 155a formed in the insulating frame 155 to push down the disk spring 159 at its center to flip it over again to its original state. If the terminals 157 and 158 have been electrically connected together again, the safety device 152 is judged nondefective.

Figure 27:
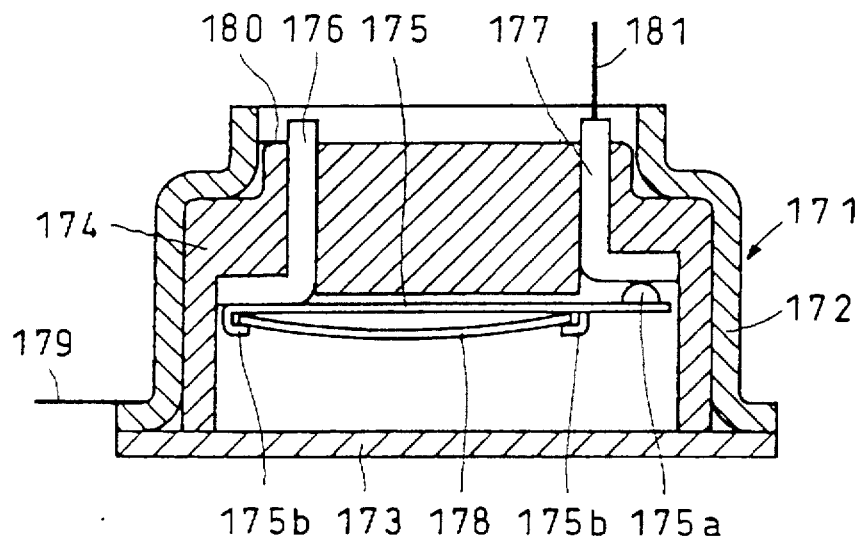
FIG. 27 is a sectional view of a safety device of a twelfth embodiment according to the present invention.

FIG. 27 shows a twelfth embodiment of the safety device according to the invention. The safety device 171 of this embodiment includes a hollow insulating frame 174 provided inside a conductor case 172 and a bottom lid 173. A contact 175 has one end thereof connected to a terminal 176 and its protrusion 175a in contact with a terminal 177. A bimetallic disk spring 178 is fastened to the contact 175 by claws 175b provided on the under side of the contact 175.

In the safety device 171, a current flows through generating unit 22→lead 179→conductor case 172→lead 180→terminal 176→contact 175→terminal 177→lead 181.

Figure 28:
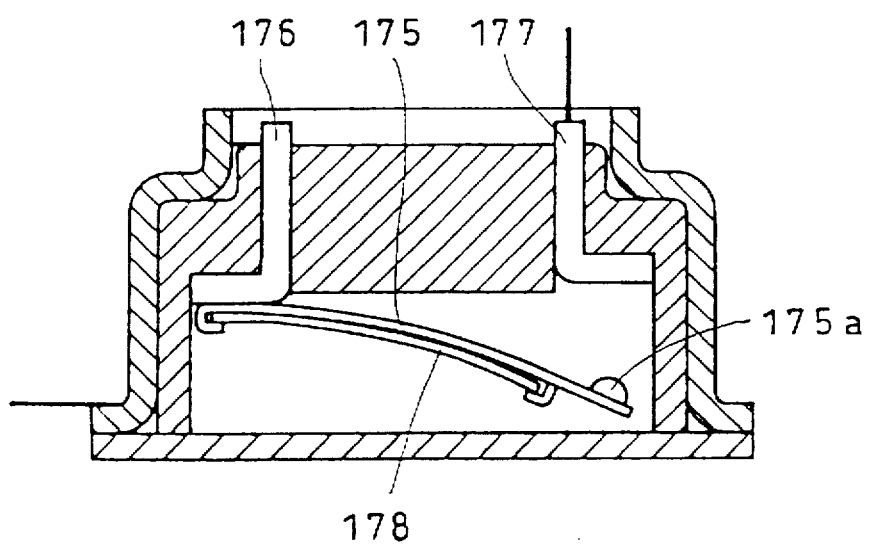
FIG. 28 is a view used to explain the operation of the safety device of FIG. 27.

If an overcurrent flows through the current-flow path, the disk spring 178 is heated quickly together with the contact 175 and flips over as shown FIG. 28, so that the current-flow path is cut instantly. The disk spring 178 is also adapted to bend backward if its temperature rises by heat conducted from outside. In either case, the protrusion 175a of the contact 175 separates from the terminal 177, cutting the current-flow path.

In the tenth through twelfth embodiments according to the invention, bimetallic disk springs are used. But any other disk spring may be used. For example, a disk spring made from a shape memory alloy may be used.

The safety devices of the tenth through twelfth embodiments of the invention may be provided with a PTC plate to suppress overcurrent and/or an aluminum foil which can release inner gas by rupturing, as in the first embodiment of the invention.

This invention is not limited to the above-described embodiments. The embodiments are susceptible to various modifications. For example, the entire safety device as well as its inner parts may have a square cross-section. The terminals may be shaped and positioned in various different ways. The parts of the safety device may be connected together, fixed together or sealed by welding such as resistance welding, ultrasonic welding or laser beam welding, or by using screws or resin molds. In short, this invention is not limited by how the safety device is machined and assembled.

As described above, if the generating unit of the battery or any element in the current-flow path heats up due to overcharging or shortcircuiting, the current-flow path is cut instantly. It is thus possible to prevent explosion of the battery.

What is claimed is:

1. A safety device for a battery having a battery case and a generating unit airtightly housed in the battery case, said safety device comprising:
    a switch means adapted to be provided in a current-flow path of the battery; and
    a thermally expansible member for gradually expanding in conjunction with a rise in temperature, wherein said thermally expansible member is disposed relative to said switch means such that, in response to a sufficient rise in temperature, said thermally expansible device will expand until said expansion effects a change over of said switch means.

2. The safety device for a battery as claimed in claim 1, further comprising a positive thermistor provided in the current-flow path in the battery.

3. The safety device for a battery as claimed in claim 1, further comprising a conductor case enclosing said thermally expansible member and said switch means, wherein said conductor case is formed with a hole through which the inside and outside of the battery case can communicate, and said hole is closed by a film adapted to rupture in response to a pressure in the battery case.

4. The safety device for a battery as claimed in claim 1, wherein said thermally expansible member is formed of a silicone rubber.

5. The safety device for a battery as claimed in claim 1, wherein said thermally expansible member is formed of a synthetic rubber.

6. The safety device for a battery as claimed in claim 1, wherein said thermally expansible device is formed of a synthetic resin.

7. A safety device for a battery having a battery case and a generating unit airtightly housed in the battery case, said safety device comprising:

a temperature-responsive deforming means in the form of a conductor, said temperature-responsive deforming means being adapted to deform when its temperature rises to a predetermined level; and a switch means disposed adjacent to said temperature-responsive deforming means, wherein said switch means is adapted to be provided in a current-flow path of the battery and said switch means changes over when said temperature-responsive deforming means deforms due to heat transferred from said switch means.

8. The safety device for a battery as claimed in claim 7, wherein said temperature-responsive deforming means is a bimetal comprising a plurality of laminated metal plates having different thermal expansion coefficients.

9. The safety device for a battery as claimed in claim 7, further comprising a positive thermistor for being provided in the current-flow path of the battery.

10. The safety device for a battery as claimed in claim 7, further comprising a conductor case enclosing said temperature responsive deforming means and said switch means, wherein said conductor case is formed with a hole through which the inside and outside of the battery case can communicate, and said hole is closed by a film adapted to rupture in response to a pressure in the battery case.

* * * * *